United States Patent
Henderson et al.

(10) Patent No.: US 10,025,274 B2
(45) Date of Patent: Jul. 17, 2018

(54) ADAPTIVE TIMING CONFIGURATION FOR ATHLETIC DEVICES

(71) Applicant: NIKE, Inc., Beaverton, OR (US)

(72) Inventors: Kristofer Henderson, Seattle, WA (US); James Bielman, Seattle, WA (US)

(73) Assignee: NIKE, Inc., Beaverton, OR (US)

( * ) Notice: Subject to any disclaimer, the term of this patent is extended or adjusted under 35 U.S.C. 154(b) by 180 days.

(21) Appl. No.: 14/512,854

(22) Filed: Oct. 13, 2014

(65) Prior Publication Data

US 2015/0103633 A1    Apr. 16, 2015

Related U.S. Application Data

(60) Provisional application No. 61/890,707, filed on Oct. 14, 2013.

(51) Int. Cl.
| | |
|---|---|
| *G08B 1/00* | (2006.01) |
| *G04G 19/12* | (2006.01) |
| *G04G 21/02* | (2010.01) |
| *G04G 13/02* | (2006.01) |
| *G06F 1/14* | (2006.01) |
| *G06F 1/32* | (2006.01) |

(52) U.S. Cl.
CPC ............. *G04G 19/12* (2013.01); *G04G 13/02* (2013.01); *G04G 21/02* (2013.01); *G06F 1/14* (2013.01); *G06F 1/3206* (2013.01)

(58) Field of Classification Search
CPC ........ G04G 19/12; G04G 13/02; G04G 21/02; G06F 1/14; G06F 1/3206
USPC .................. 340/309.16; 368/10–12
See application file for complete search history.

(56) References Cited

U.S. PATENT DOCUMENTS

| | | | |
|---|---|---|---|
| 5,771,390 A | 6/1998 | Walker et al. | |
| 6,144,619 A * | 11/2000 | Reisman | G04F 1/005 368/10 |
| 2005/0209804 A1* | 9/2005 | Basso | H04L 69/28 702/79 |
| 2006/0190752 A1 | 8/2006 | Lee | |
| 2007/0076530 A1* | 4/2007 | Robinett | G04F 1/005 368/107 |
| 2007/0268784 A1* | 11/2007 | Xu | G04G 13/026 368/73 |

(Continued)

FOREIGN PATENT DOCUMENTS

EP    2612595 A2    7/2013

OTHER PUBLICATIONS

May 4, 2015—(WO) ISR/WO—App. No. PCT/US2014/060268.

*Primary Examiner* — Thomas Mullen
(74) *Attorney, Agent, or Firm* — Banner & Witcoff, Ltd.

(57) ABSTRACT

A system configured to allow one or more timing processes to accurately keep track of one or more timers while a processor executing the one or more timing processes is in a low-power operational mode. The system is configured to set a real-time clock alarm expiration time equal to a closest expiration time, from a current time, of the one or more timers. Accordingly, upon expiration of the real-time clock alarm, an interrupt is communicated to the processor, resulting in the processor being brought out of a low-power operational mode, and executing one or more processes associated with the corresponding expired timer.

15 Claims, 10 Drawing Sheets

(56) References Cited

U.S. PATENT DOCUMENTS

| | | | | |
|---|---|---|---|---|
| 2008/0104434 A1* | 5/2008 | May | ............ | G06F 1/3203 |
| | | | | 713/322 |
| 2009/0040874 A1* | 2/2009 | Rooney | ............ | A61J 7/0472 |
| | | | | 368/10 |
| 2009/0259865 A1* | 10/2009 | Sheynblat | ............ | G06F 1/3203 |
| | | | | 713/323 |
| 2009/0284389 A1* | 11/2009 | Klassen | ............ | G04G 11/00 |
| | | | | 368/10 |
| 2010/0153765 A1* | 6/2010 | Stemen | ............ | G06F 1/3203 |
| | | | | 713/340 |
| 2010/0214877 A1* | 8/2010 | Turk | ............ | A61J 7/0481 |
| | | | | 368/10 |
| 2010/0214987 A1* | 8/2010 | Mori | ............ | A63F 13/12 |
| | | | | 370/328 |
| 2010/0276496 A1* | 11/2010 | Slikkerveer | ............ | G06K 19/07 |
| | | | | 235/492 |
| 2011/0055607 A1* | 3/2011 | Hughes | ............ | G06F 1/3203 |
| | | | | 713/323 |
| 2012/0169454 A1* | 7/2012 | Petersen | ............ | G08B 1/08 |
| | | | | 340/4.1 |
| 2012/0293323 A1* | 11/2012 | Kaib | ............ | G06F 19/3418 |
| | | | | 340/539.12 |
| 2013/0099757 A1* | 4/2013 | Ham | ............ | H02J 7/0047 |
| | | | | 320/150 |
| 2014/0066735 A1* | 3/2014 | Engelhardt | ............ | A61B 5/14532 |
| | | | | 600/365 |

* cited by examiner

ADAPTIVE TIMING CONFIGURATION FOR ATHLETIC DEVICES

CROSS REFERENCE TO RELATED APPLICATIONS

This application claims the benefit of, and priority to, U.S. Provisional Patent Application No. 61/890,707, entitled "ADAPTIVE TIMING CONFIGURATION FOR ATHLETIC DEVICES" filed Oct. 14, 2013. The content of which is expressly incorporated herein by reference in its entirety for any and all non-limiting purposes.

BACKGROUND

Modern technology has given rise to a wide variety of different electronic and/or communication devices that keep users in touch with one another, entertained, and informed. A wide variety of portable electronic devices are available for these purposes, such as: cellular telephones; personal digital assistants ("PDAs"); pagers; beepers; MP3 or other audio playback devices; radios; portable televisions, DVD players, or other video playing devices; watches; GPS systems; etc. Many people like to carry one or more of these types of devices with them when they exercise and/or participate in athletic events, for example, to keep them in contact with others (e.g., in case of inclement weather, injuries; or emergencies; to contact coaches or trainers; etc.), to keep them entertained, to provide information (time, direction, location, and the like).

Athletic performance monitoring systems also have benefited from recent advancements in electronic device and digital technology. Electronic performance monitoring devices allow for monitoring of many physical or physiological characteristics associated with exercise or other athletic performances, including, for example: speed and distance data, altitude data, GPS data, heart rate, pulse rate, blood pressure data, body temperature, etc. Specifically, these athletic performance monitoring systems have benefited from recent advancements in microprocessor design, allowing increasingly complex computations and processes to be executed by microprocessors of successively diminutive size. These modern microprocessors may be used for execution of activity recognition processes, such that a sport or activity that is being carried out by an athlete can be recognized, and information related to that sport or activity can be analyzed and/or stored.

Inherently, however, portable electronic device systems are often powered by limited power sources, such as rechargeable batteries. Accordingly, as the computations carried out by these devices have become increasingly complex, the power consumption of the integral processors carrying out the computations has significantly increased. Consequently, the usable time between battery recharges has decreased.

In some instances it may be desirable to place one or more processors associated with a portable electronic device into a low-power operational mode. As such, a processor executing a low-power operational mode may operate using a low clock rate/clock speed that is below an operating clock rate. However, a processor executing a low-power operational mode may not be able to maintain (continue executing) one or more timer processes (timers). As such, a portable electronic device using one or more timer processes may require that a processor continues to operate in a high-power operational mode, and hence, operate with an associated relatively high power consumption.

Aspects of this disclosure are directed towards novel systems and methods that address one or more of these deficiencies. Further aspects relate to minimizing other shortcomings in the art.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one aspect, this disclosure includes a system configured to allow one or more timing processes to accurately keep track of one or more timers while a processor executing the one or more timing processes is in a low-power operational mode. The system is configured to set a real-time clock alarm expiration time equal to a closest expiration time, from a current time, of the one or more timers. Accordingly, upon expiration of the real-time clock alarm, an interrupt is communicated to the processor, resulting in the processor being brought out of a low-power operational mode, and execution one or more processes associated with the corresponding expired timer.

In another aspect, this disclosure relates to an apparatus having a processor, a real-time clock alarm module, and a real-time clock calendar module configured to trigger an expiration of a real-time clock alarm. The apparatus further has a memory storing instructions that are executed by the processor, causing the apparatus to store timers in a queue, identify expired timers from the queue upon expiration of a real-time clock alarm, execute processes associated with expired timers, remove expired timers from the queue, and set a real-time clock alarm to expire at expiration time associated with a timer remaining in the queue.

In yet another aspect, this disclosure relates to an apparatus configured to be worn on an appendage of a user, and having a power supply, and a sensor configured to capture data based on the user's movement. The apparatus may further include a processor configured to receive captured movement data, and a real-time clock alarm module. The apparatus may further have computer-executable instructions that are executed by the processor, and store timers in a data structure, identify expired timers upon expiration of a real-time clock alarm, execute one or more processes associated with the expired timers, remove expired timers from the data structure, and set a real-time clock alarm to expire at a time of expiration of a timer in a data structure.

In another aspect, this disclosure relates to a non-transitory computer-readable medium comprising computer-executable instructions executed by a processor to store timers in a data structure, and identify one or more timers that will expire within a predetermined active time period, upon expiration of a real-time clock alarm. The computer-executable instructions may further execute one or more processes associated with the identified timers, and set an alarm expiration time of a real-time clock alarm equal to an expiration time of the timer stored in the data structure. Additionally, the computer-executable instructions may set the processor to operate in a low-power operational mode.

DETAILED DESCRIPTION

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
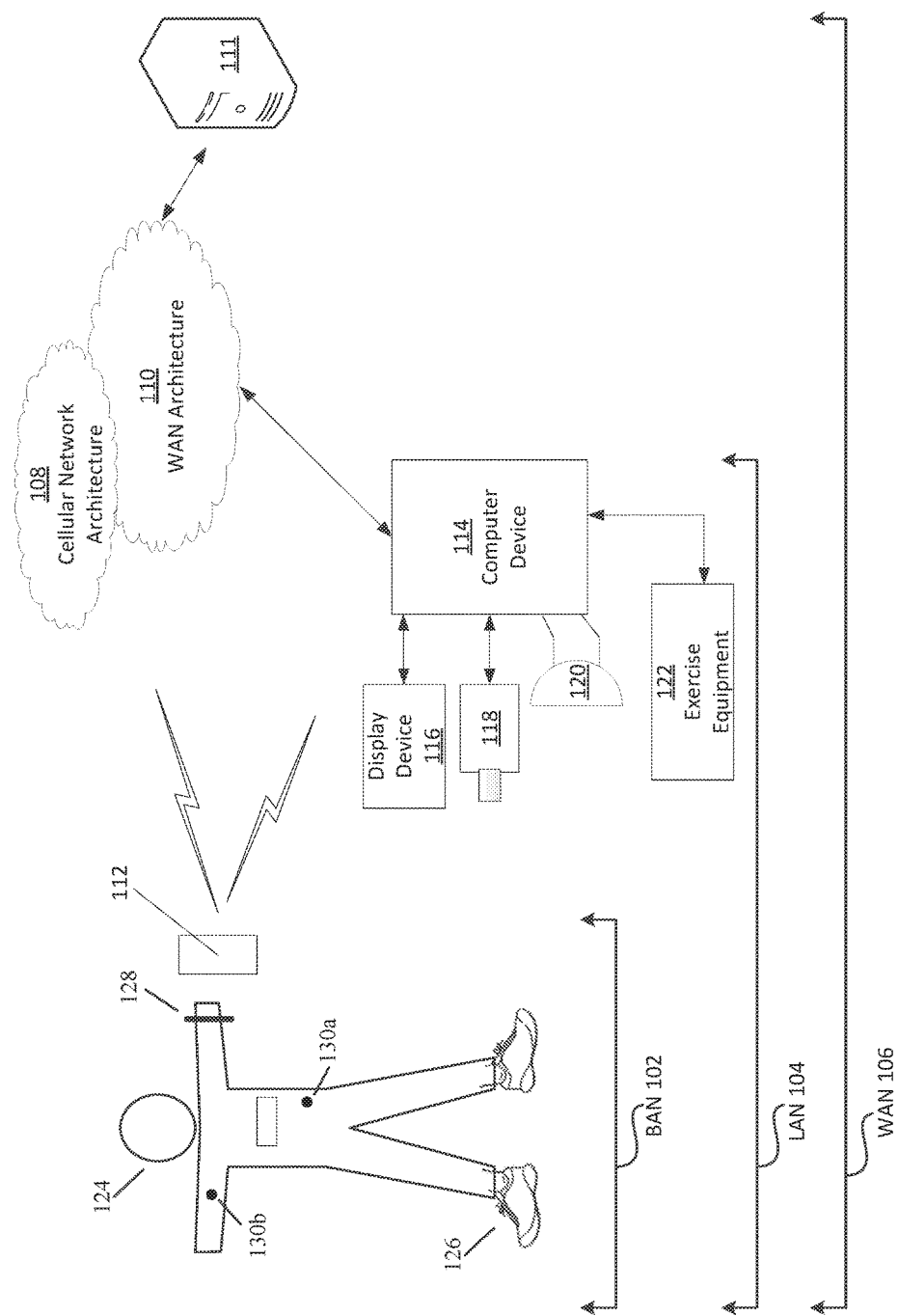
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
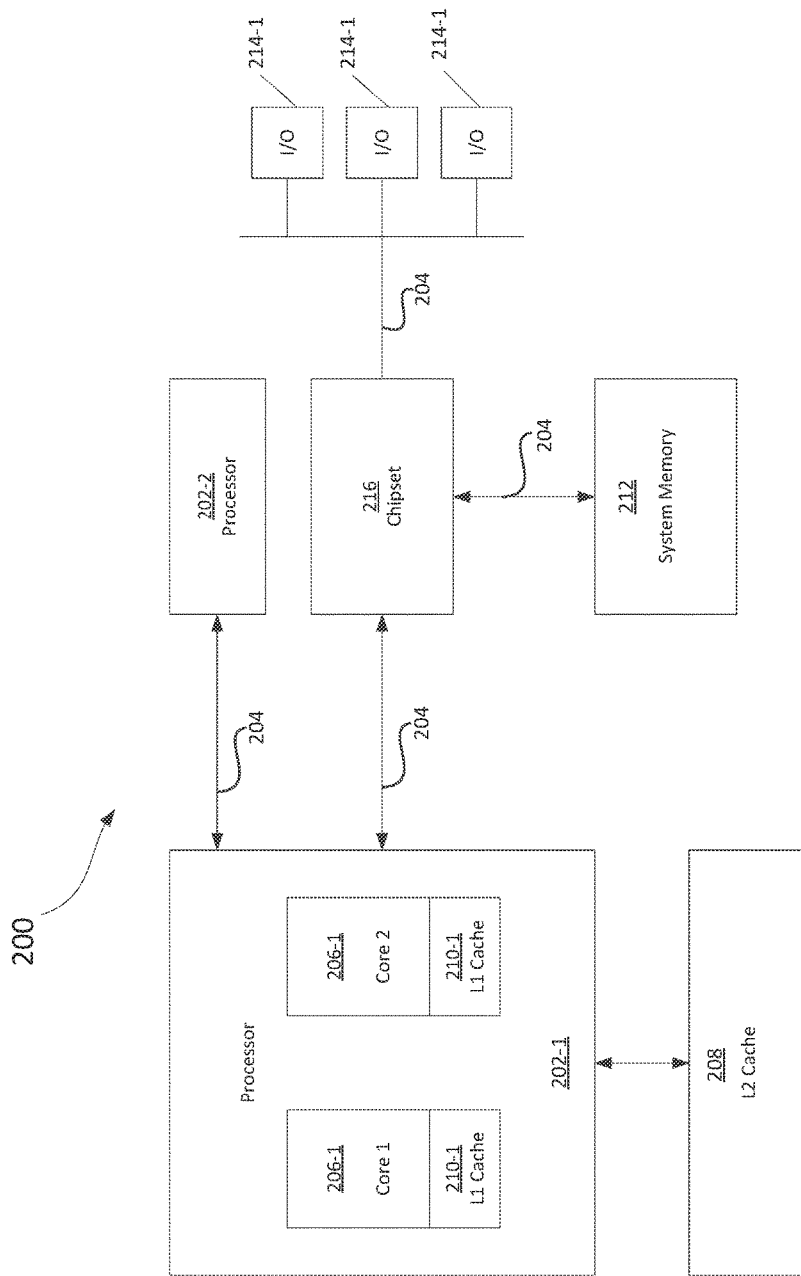
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively).

One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-mounted Device

Figure 3:
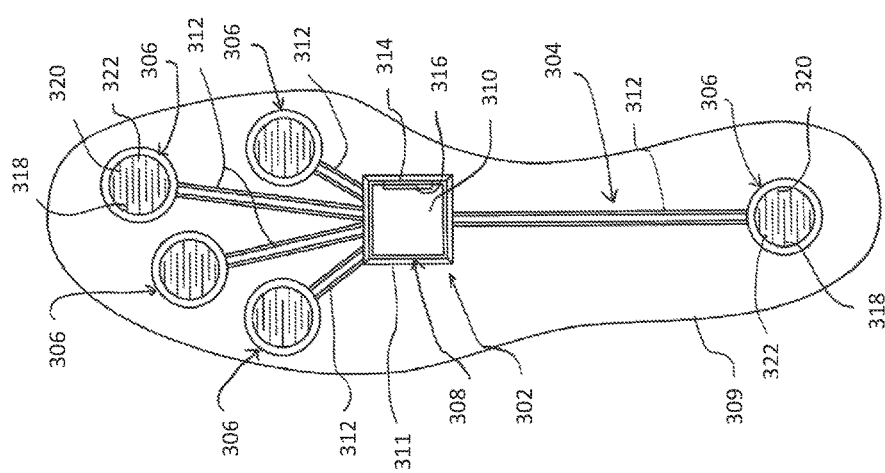
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-worn Device

Figure 4:
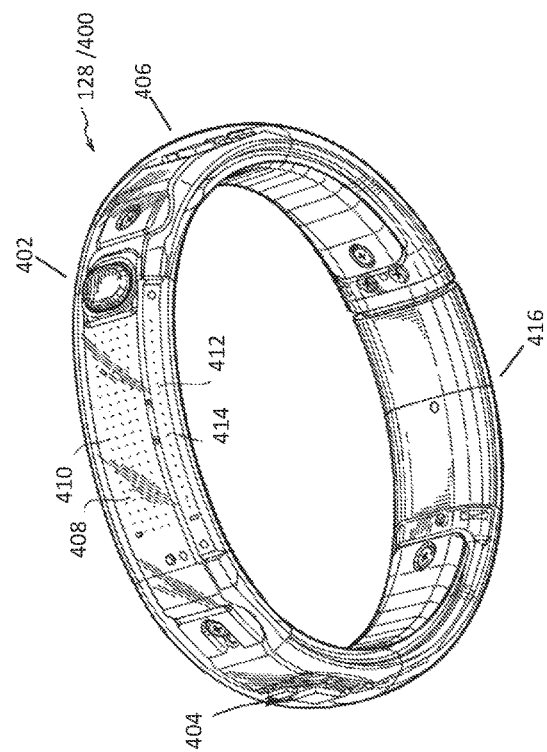
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
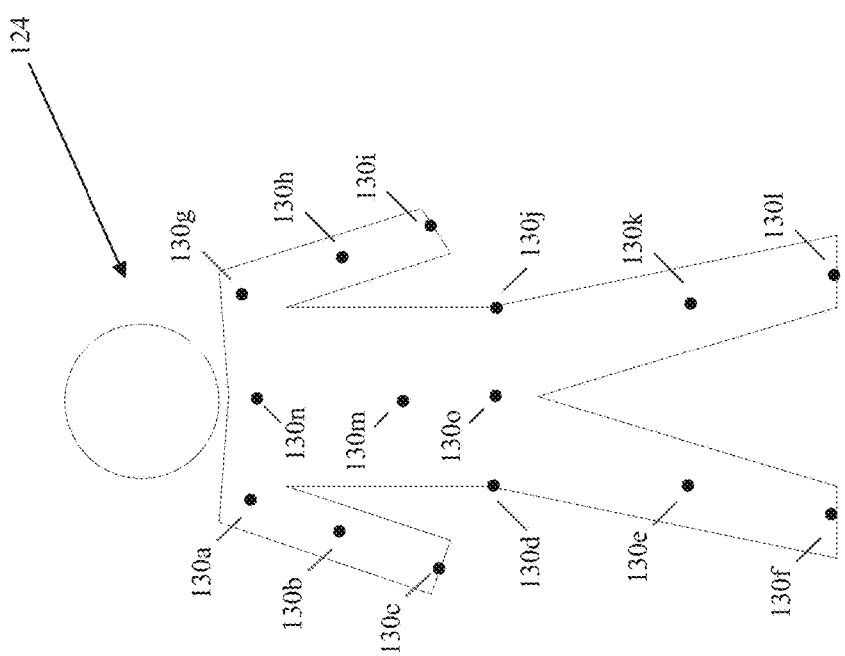
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a., center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

In one implementation, this disclosure includes a system configured to allow one or more timing processes to accurately keep track of one or more timers while a processor executing the one or more timing processes is in a low-power state (otherwise referred to as a low-power configuration, a low-power operational mode, or a low-power mode). In one embodiment, the processor cannot monitor at least one of the timing processes while in this state. Yet in another embodiment, the processor may not be able to monitor at least one of the timing processes as accurately as when configured into the operational mode. The system is configured to set a real-time clock alarm expiration time equal to a closest expiration time, from a current time, of the one or more timers. Accordingly, upon expiration of the real-time clock alarm, an interrupt is communicated to the processor, resulting in the processor being brought out of a low-power operational mode, and execution one or more processes associated with the corresponding expired timer may be performed.

Figure 6:
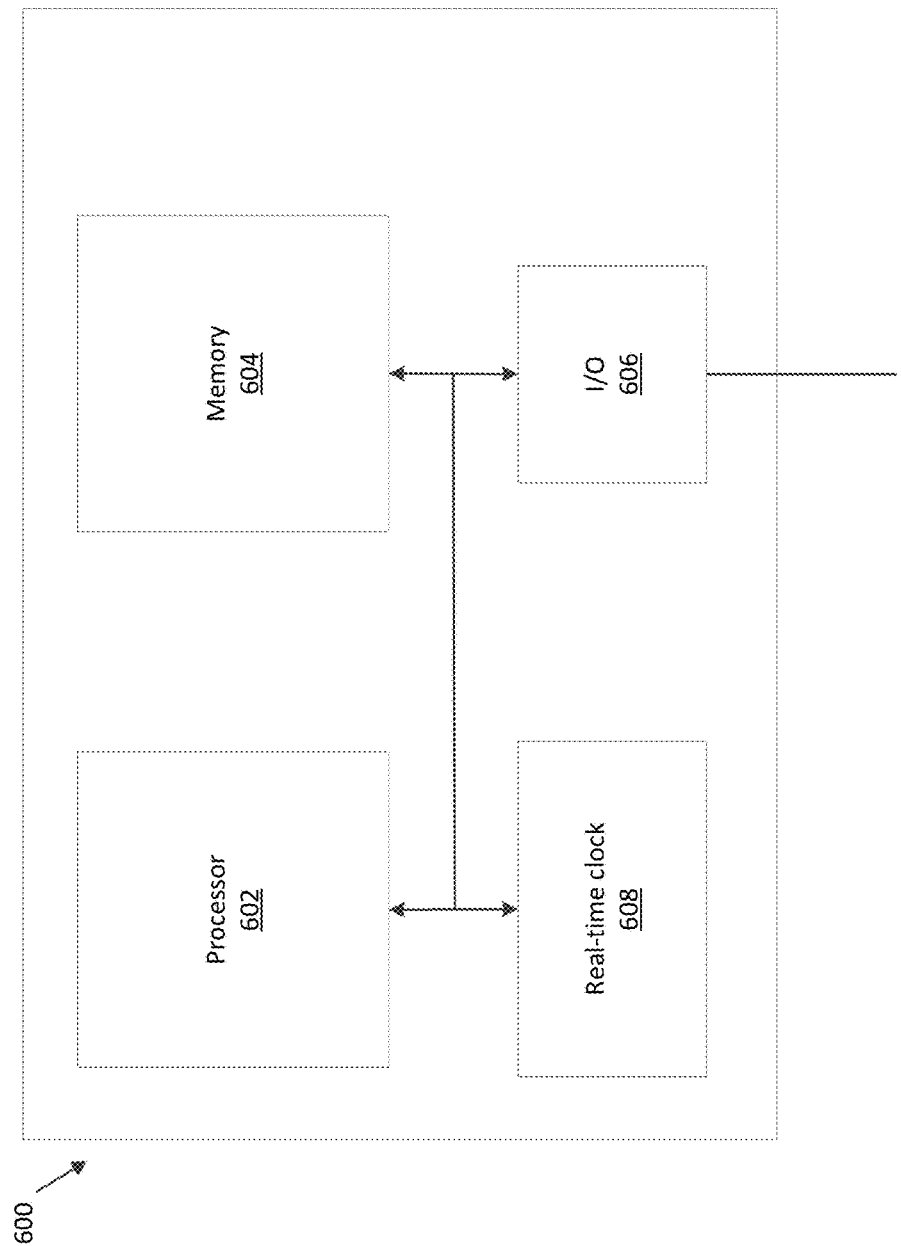
FIG. 6 depicts a schematic block diagram of an illustrative microcontroller.

FIG. 6 depicts a schematic block diagram of an exemplary microcontroller 600. In one configuration, microcontroller 600 may be similar to, or identical to the controller 404 from FIG. 4. Accordingly, in one example, microcontroller 600 may be positioned within a portable electronic device, such as device assembly 400 from FIG. 4. In one embodiment, microcontroller 600 may include a processor 602, a memory 604, an interface 606, and a real-time clock (RTC) 608.

It will be readily apparent to those of skill that the depicted components of microcontroller 600 may be configured on a same physical electrical circuit. Accordingly, in one implementation, microcontroller 600 may be implemented on, among others, a printed circuit board, a microprocessor chip, a field-programmable gate array, or a breadboard, among others. However, it will also be readily apparent to those of skill that the depicted components of microcontroller 600 may be implemented as discrete hardware blocks on separate hardware chips. Furthermore, where FIG. 6 schematically depicts a hardware element of microcontroller 600 as a single schematic block, it will be readily understood to those of skill in the art that said schematic block may be implemented as one or more separate physical hardware elements. Additionally, it will be understood that while element 600 is described as a microcontroller 600, the term "microcontroller" should not be limited to devices and/or subcomponents of any particular physical size/range of sizes.

Those of skill in the art will also recognize that microcontroller 600 may include additional elements beyond those depicted in the schematic block diagram of FIG. 6. For example, microcontroller 600 may include a power supply (not shown). Additionally, one or more elements may be removed from the depicted microcontroller 600, without departing from the scope of the disclosures described herein. For example, real-time clock 608, or one or more subcomponents thereof, may be implemented as one or more discrete electronic circuits that are separate to, but operatively connected to, a microcontroller circuit.

In one arrangement, interface 606 may represent one or more data pins, wires, cables, data buses, sockets and/or connectors for communicating data and/or power to and/or from microcontroller 600. In this way, interface 606 may be configured to draw power from a power supply, such as a battery. Additionally or alternatively, interface 606 may be configured to supply power to and/or communicate data to and from, one or more additional components of a unitary device, such as device 400. Furthermore, interface 606 may communicate power and/or data to/from one or more components associated with a separate device to that device (device 400) with which microcontroller 600 may be operatively connected. Accordingly, interface 606 may be configured to communicate across one or more network types, such as, for example, a local area network (LAN), a storage area network (SAN), a wide area network (WAN), and/or the Internet, among others. Furthermore, interface 606 may be configured to communicate using one or more architecture types and/or topologies, including cable, fiber, satellite, telephone, cellular, wireless, etc. and as such, having one or more wired or wireless communication channels (including but not limited to: WiFi®, Bluetooth®, Near-Field Communication (NFC) and/or ANT technologies).

In one arrangement, microcontroller 600 comprises a memory 604, wherein memory 604 may represent one or more discrete hardware memory circuits ("chips"), and utilizing one or more different memory technologies. Accordingly, memory 604 may comprise a form of volatile memory that may be cleared upon a power cycle of microcontroller 600 (removing and subsequently reinstating a power supply to memory 604). As such, memory 604 may comprise one or more memory registers, or random access memory (RAM) devices, among others. Additionally or alternatively, memory 604 may comprise one or more persistent forms of memory that retain stored data once power has been removed from the memory device. As such, memory 604 may comprise one or more of a read only memory (ROM) device, an optical device (hard disk drive (HDD), optical disk (CD/DVD, and the like), a solid state drive (SSD), a tape device, among others.

Real-time clock module 608 (otherwise referred to simply as real-time clock 608) may be implemented as one or more integrated circuits for keeping track of a current time and/or date. Furthermore, real-time clock 608 may keep track of a current time and/or date independent of processor 602, and such that processor 602 may be active (in one implementation, in a high-power operational mode), or inactive (in one implementation, in a low-power operational mode, or powered off) while real-time clock 608 accurately keeps track of a current time and/or date. As such, real-time clock 608 may be operational while processor 602 is in a low-power operational mode, or while processor 602 is non-functional. Real-time clock 608 will be described in further detail with reference to FIG. 7.

Processor 602 may represent one or more processing cores that may operate in series and/or parallel, wherein various methodologies utilized by processors for executing computational tasks, including parallel processing, will be known to those of skill in the art. Furthermore, processor 602 may carry out computations with a frequency that may be referred to as a clock rate. This clock rate of processor 602 may be a single frequency value, or alternatively, may be a range of frequencies within which processor 602 operates during normal operational periods. In one configuration, processor 602 may be configured to operate with a clock rate of several hundred hertz (Hz), multiple megahertz (MHz), or multiple gigahertz (GHz), and the like. In one example, a design operational clock rate for processor 602 may be referred to as a high-power state (otherwise referred to as a high-power configuration, a high-power operational mode, or a high-power mode) of processor 602. In another example, processor 602 may be entered into a low-power state (otherwise referred to as a low-power configuration, a low-power operational mode, or a low-power mode), whereby the low-power state may be associated with a low clock rate and/or low power consumption by processor 602. In another example, processor 602 may be entered into a low-power operational mode associated with a clock rate and/or a power consumption by processor 602 that may be substantially, or exactly equal to zero. In one example, processor 602 may draw a current of approximately 10 mA (milliamps) or more during operation (execution of one or more computations) in a high-power operational mode. In contrast, processor 602 may draw a current of approximately 250 uA (microamps) or less while operating in a low-power operational mode. As such, a power consumption of processor 602 may be reduced by at least 90% by setting processor 602 from a high-power operational mode into a low-power operational mode. It will be readily understood by those of skill in the art, however, that the various alternative clock rates and power consumption values for both a high-power operational mode and a low-power operational mode of processor 602 may be implemented, without departing from the scope of the disclosure described herein. Accordingly, in other implementations, a current drawn by a processor 602 may be reduced by at least 30%, at least 50%, or at least 75%, and the like, upon transitioning from a high-power operational mode into a low-power operational mode. Accordingly, in other implementations, power consumption by processor 602 may be reduced by at least 30%, at least 50%, or at least 75%, and the like, upon transitioning from a high-power operational mode into a low-power operational mode.

The use of timers for executing a plurality of different processes associated with the operation of, in one example, a portable electronic device, such as device 400, will be known to those of skill in the art. In one example, processor 602 may execute one or more processes to time various actions, intervals, responses, and/or processes, and the like. In one implementation, processor 602 may execute one or more timers using a combination of hardware, firmware, and/or software. In one configuration, however, one or more timers implemented by processor 602 may rely upon processor 602 operating in a high-power operational mode. For example, one or more timers may rely upon processor 602 operating at a design clock rate in a high-power operational mode. In one configuration, a design clock rate (in a high-power operational mode) may be 500 MHz, while a low clock rate associated with a low-power operational mode may be less than 100 Hz, or maybe substantially equal to 0 Hz. As such, processor 602 may not be able to maintain conventional timers when processor 602 is set into a low-power operational mode.

In one example, processor 602 may execute one or more processes to implement one or more timers in software. A timer may be used to, among others, countdown a time until one or more subsequent processes are to be executed. Specifically, in one example, a timing process may be used to countdown a time until a display, such as display 408 from FIG. 4, is to be refreshed. However, a timer, executed by processor 602, may rely upon processor 602 operating at a design clock rate (otherwise referred to as a normal operational clock rate, wherein a normal operational clock rate may vary depending upon the specific model of processor 602 used, and may range from several hundred hertz to several gigahertz, and the like). As such, a timer, executed by processor 602, may not keep track of time accurately, or may be fully nonfunctional upon setting processor 602 into a low-power operational mode.

In one implementation, microcontroller 600 may be implemented as any known microcontroller in the art. In another implementation, microcontroller 600 may be implemented as one or more microcontrollers from a range of microcontrollers produced by STMicroelectronics. Accordingly, in one implementation, microcontroller 600 may be from a product range of STMicroelectronics 32-bit microcontrollers (otherwise referred to as STM32 microcontrollers).

Figure 7:
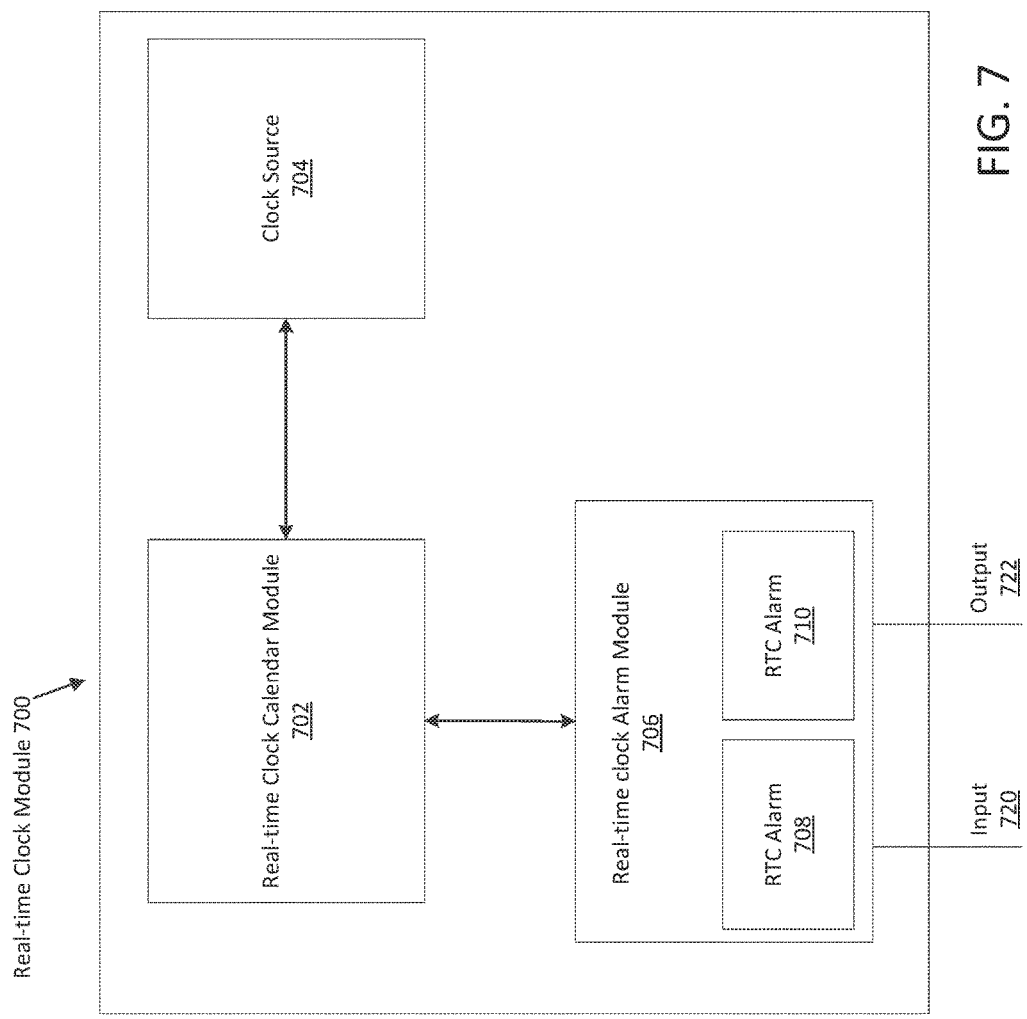
FIG. 7 depicts a schematic block diagram of an illustrative real-time clock module.

FIG. 7 is a schematic block diagram of a real-time clock module 700 (otherwise referred to simply as a real-time clock 700). In one implementation, real-time clock module 700 may be similar to, or identical to, real-time clock module 608 from FIG. 6. In particular, FIG. 7 depicts a more detailed view of one implementation of a real-time clock 700, and comprising a real-time clock calendar module 702, a clock source 704, and a real-time clock alarm module 706, having two (hardware) real-time clock alarms 708 and 710. Additionally, real-time clock 700 includes an input 720 and an output 722. It will be readily apparent to those of skill in the art that real-time clock 700 depicted in FIG. 7 is merely one example of a real-time clock, and various different configurations of the depicted elements may be used without departing from the scope of this disclosure. Additionally, one or more elements from real-time clock 700 may be omitted, without departing from the scope of this disclosure. In other configurations, real-time clock 700 may include one or more elements not shown in FIG. 7. For example, real-time clock 700 may include a battery, or other power supply, operatively connected to one or more of components 702, 704, 706, 708, 710, 720, 722.

Real-time clock 700 is depicted in FIG. 7 as a single component comprising sub-components (702, 704, 706, 708, 710, 720, 722). Accordingly, real-time clock 700 may be configured as a single hardware component, such as a printed circuit board (PCB), microchip, application-specific integrated circuit (ASIC), and/or field-programmable gate array (FPGA), and the like. Additionally or alternatively, real-time clock 700, or one or more sub-components (702, 704, 706, 708, 710, 720, 722) may be embodied as two or more separate hardware components (microchips, ASICs, FPGAs, PCBs) operatively connected to one another.

Clock source 704 represents one or more resonator components for providing a oscillation frequency that may be used to accurately keep time. For example, clock source 704 may comprise a quartz oscillator crystal with an oscillation (resonance) frequency of 32.768 kHz ($2^{15}$ Hz). Additionally or alternatively, clock source 704 may comprise one or more oscillators with frequencies of oscillation of 1-24 MHz, and/or 37 kHz, among others. Accordingly, it will be readily understood to those of skill in the art that an oscillator providing a predictable frequency of oscillation may be used to accurately keep track of time by clocking one or more electronic circuits based on an input frequency of oscillation provided by clock source 704. Accordingly, clock source 704 may provide a frequency input to real-time clock calendar module 702.

Real-time clock calendar module 702 (otherwise referred to simply as a real-time clock calendar 702) may comprise one or more electronic circuits for keeping track of a current time and date. Accordingly, real-time clock calendar module 702 may use one or more register circuits to store a date and/or a time. In one implementation, real-time clock calendar 702 may store the current date and/or time in a binary-coded decimal (BCD) format. As such, real-time clock calendar module 702 may include values in one or more memory register circuits corresponding to: a date, a week date, a month, a year, a value representing an A.M. or a P.M. time, an hour, a minute, a second, and a sub-second.

In one configuration, real-time calendar module 702 may be operatively connected to real-time clock alarm module 706, as depicted in FIG. 7. In one implementation, real-time clock alarm module 706 may comprise one or more memory register circuits. As depicted in FIG. 7, real-time clock alarm module 706 comprises two (hardware) real-time clock alarms 708 and 710. However, those of skill will recognize that real-time clock alarm module 706 may comprise a single hardware alarm, or three or more hardware alarms.

A real-time clock hardware-based alarm, such as alarm 708 or 710 may be configured to expire at a predetermined expiration time, or after a predetermined expiration period has elapsed. Accordingly, a real-time clock alarm, such as alarm 708 and/or 710, may store values in one or more memory register circuits in a similar format to that of real-time clock calendar module 702, and include values corresponding to: a date, a week date, a month, a year, a value representing an A.M. or a P.M. time, an hour, a minute, a second, and a sub-second. In one embodiment, the real-time clock alarm, such as alarm 708 and/or 710, may expire upon agreement between a stored expiration time and a stored current time, wherein the expiration time may be stored in one or more memory registers associated with a hardware alarm, and wherein the current time may be stored in one or more memory registers associated with real-time clock calendar module 702.

Upon expiration of one or more hardware-based real-time clock alarms 708 and/or 710, real-time clock alarm module 706 may output an interrupt signal, which may be, among others, a high or a low voltage signal on a specific pin/wire from real-time clock alarm module 706. Additionally, or alternatively, an interrupt signal may comprise information related to the interrupt, such as, among others, the specific real-time clock alarm (708 and/or 710) from which the interrupt signal originated. Additionally, upon expiration of one or more real-time clock alarms 708 and/or 710, real-time clock alarm module 706 may output a flag signal, otherwise referred to simply as a flag. Accordingly, a flag may be a voltage level from a specific output pin/wire of real-time clock alarm module 706 that may be interpreted as corresponding to a specific real-time clock alarm (708 and/or 710). Additionally or alternatively, a flag signal may communicate data related to the expiration of one or more real-time clock alarms 708 and/or 710.

Output 722 represents one or more hardware connections between real-time clock alarm module 706 and one or more components of microcontroller 600. As such, output 722 may represent one or more pins, wires, or any other media for communication of an electronic signal (binary voltage level, or signal carrying additional information, and the like). In one configuration, output 722 represents one or more operative connections between real-time clock alarm module 706 and processor 602 from FIG. 6. As such, output 722 may be used to communicate one or more interrupt signals and/or flag signals from one or more of real-time clock hardware-based alarms 708 and/or 710. In this way, output 722 may be configured to communicate information from real-time clock 700 to processor 602, where said information may be interpreted by one or more processes (which may, in one implementation, be software processes) executed by processor 602. Similarly, input 720 may represent one or more operative connections between real-time clock alarm module 706 and one or more components of microcontroller 600. In one configuration, input 720 may operatively connect real-time clock alarm module 706 to processor 602 such that processor 602 may communicate one or more of an alarm expiration time and/or an alarm expiration period from one or more software processes executed by processor 602, to one or more real-time clock alarms 708 and/or 710 of real-time clock alarm module 706.

As previously described, processor 602 may be set into a low-power operational mode, wherein said low-power operational mode may comprise one or more of a sleep mode, a low-power run mode, a low-power sleep mode, a standby mode, and/or a stop mode, and collectively referred to as a low-power mode. While set into a low-power mode, processor 602 may operate at a low clock rate (frequency) that does not allow timing processes (which may be, in one implementation, software timers) to keep track of time accurately. In another implementation, while set into a low-power mode, processor 602 has a clock rate substantially equal to 0 Hz, and similarly, does not allow timing processes to keep track of time accurately.

Advantageously, certain systems and methods described herein allow a processor, such as processor 602, to execute one or more timing processes while allowing said processor 602 to be set into a low-power mode, without affecting the accuracy of said timing processes. Yet other embodiments may reduce the inaccuracies in timing resulting from the device entering into a lower-power mode. In one configuration, a hardware-based alarm, such as real-time clock alarm 708 and/or 710 from real-time clock alarm module 706, may be operatively connected to processor 602, and allow for a plurality of timer processes to run using processor 602 in communication with memory 604. In one example, a single hardware alarm 708 and/or 710 may be in communication with processor 602, wherein processor 602 may maintain tens, hundreds, or thousands of timer processes.

Figure 8:
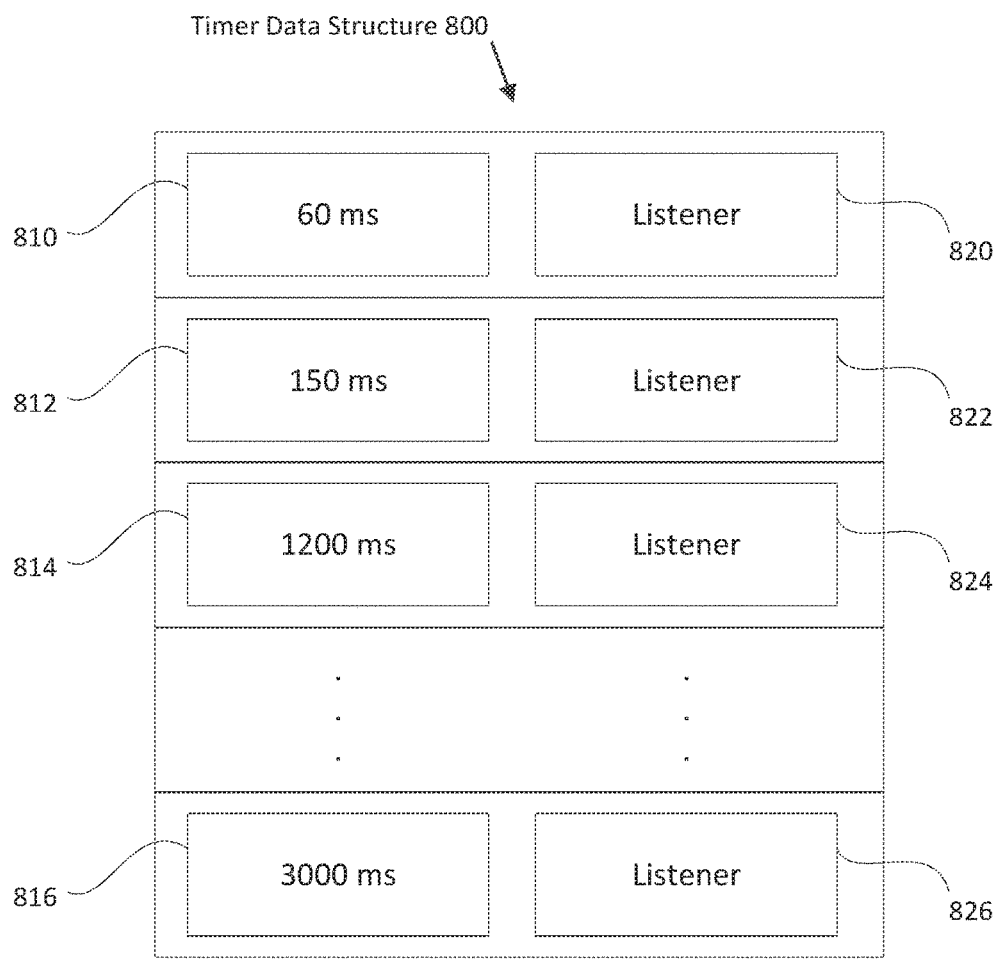
FIG. 8 depicts a schematic block diagram of one exemplary timer data structure.

In one configuration, processor 602 may store one or more timer processes within a timer data structure in memory 604. FIG. 8 depicts a schematic block diagram of one exemplary timer data structure 800. Accordingly, timer data structure 800 represents one embodiment of a structure for storing timer process information, and those of skill in the art will recognize that a plurality of different structures may be employed to store timer process information in memory 604, without departing from the scope of this disclosure. In one implementation, timer data structure 800 includes one or more separate timers, wherein a timer may be associated with an expiration period and one or more listener processes. For example, timer data structure 800 includes a timer having an expiration period 810 and one or more listener processes 820. In this example, expiration period 810 stores a time, in milliseconds, wherein said time represents an offset time, from a current time, at which the timer is to expire. Upon expiration of the timer, processor 602 may execute one or more processes to communicate a signal to listener 820 that the timer has expired. Accordingly, listener 820 may comprise one or more processes executing in a loop until a signal is received indicating that an associated timer has expired. In response, listener 820, upon receiving a signal that an associated timer has expired, may execute one or more processes associated with the expiration of said timer.

In one example, timer data structure 800 may be ordered based on increasing expiration periods of those stored timers. Accordingly, timer data structure 800 may be referred to as a queue structure. In another example, timer data structure 800 may be a stack data structure, and the like. As such, those four timers depicted in timer data structure 800 are ordered in order of increasing expiration periods, with expiration periods 810, 812, 814, and 816, having respective expiration periods of 60 ms, 150 ms, 1200 ms, and 3000 ms, and associated with respective listeners 820, 822, 824, and 826. In other embodiments, as will be apparent to those of skill in the art, timers stored in timer data structure 800 within memory 604 may be ordered based on one or more factors other than expiration periods.

Figure 9:
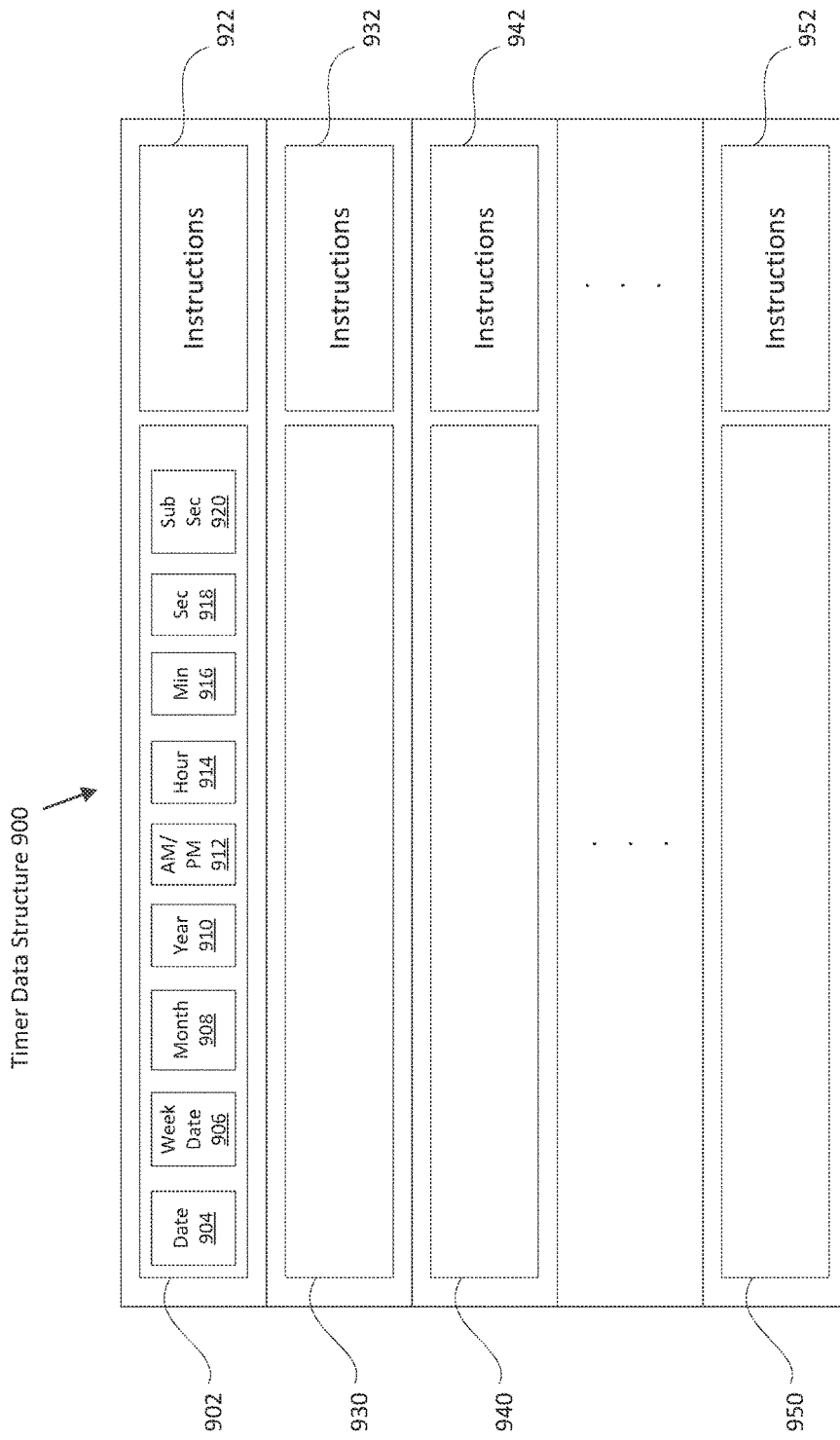
FIG. 9 depicts a schematic block diagram of an alternative exemplary timer data structure.

FIG. 9 depicts a schematic block diagram of another timer data structure 900. In particular, timer data structure 900 stores information related to one or more timers, wherein a timer has an associated expiration time and date, rather than an offset expiration period from a current time. In one configuration, a timer stores an expiration time and date in memory, such as memory 604. In one implementation, an expiration time and date may be stored in memory using data values similar to those values stored in one or more memory register circuits associated with real-time clock alarm 706, and real-time clock calendar 702. As such, in one configuration, a timer, such as timer 902, stores an expiration time and date as one or more of a date value 904, a week date value 906, a month value 908, a year value 910, a value representing an A.M. or a P.M. time 912, an hour value 914, a minute value 916, a second value 918, and a sub-second value 920. In another implementation, timer 902 may store values in addition to those depicted values 904-920, and/or may store expiration times using fewer values than those depicted (904-920). Additionally, a timer, such as timer 902 may store one or more processes, or instructions, to be executed upon expiration of a respective timer. As such, timer 902 may be associated with instructions 922, wherein the instructions 922 comprise one or more processes to be executed upon expiration of a timer. For example, processor 602 may store timer 902 in timer data structure 900 in order to schedule a refresh of a display, such as display 408 of device 400. Accordingly, processor 602 may store an expiration time and date associated with this exemplary display-refresh timer within values 904 to 920. Additionally, processor 602 may store one or more processes, within instructions 922, to be executed upon expiration of the timer 902 at the expiration time. These one or more processes may include instructions to refresh the display 408 of device 400.

In a similar manner to timer data structure 800 from FIG. 8, timer data structure 900 may store one or more timers in order of increasing expiration time. As such, timer 902 associated with instructions 922, timer 930 associated with instructions 932, timer 940 associated with instructions 942, and timer 950 associated with instructions 952 may be ordered in a queue structure in order of increasing expiration time.

In another embodiment, as will be readily apparent to those of ordinary skill in the art, timer data structure 900 may include additional elements to those depicted in FIG. 9. For example, timer data structure 900 may comprise timers, such as timers 902, 930, 940, and 950, storing a timer expiration time and/or a timer expiration period. Additionally or alternatively, timer data structure 900 may store instructions, such as instructions 922, 932, 942, and 952, in combination with one or more listeners, such as listener 820, 822, 824, and 826.

Figure 10:
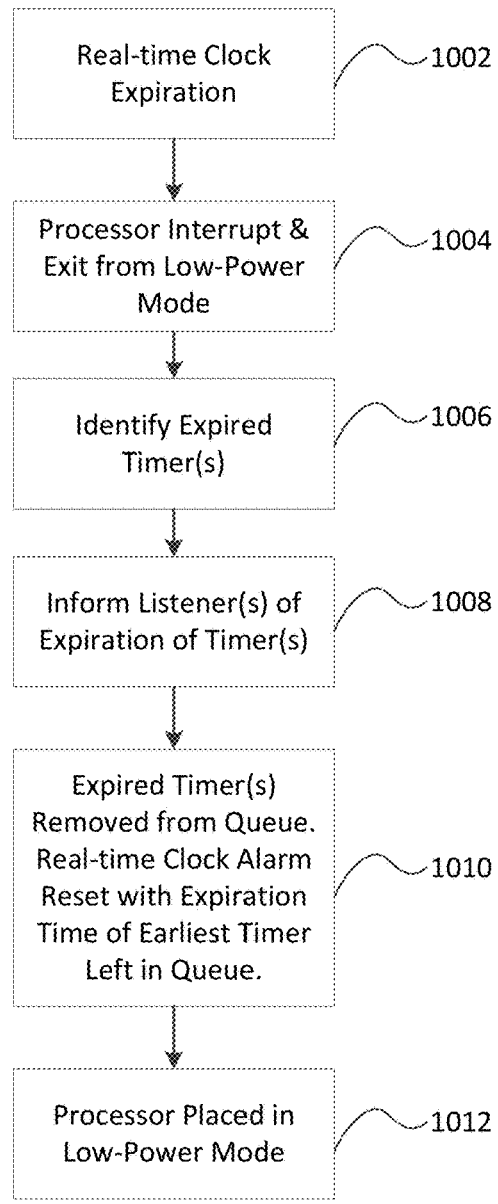
FIG. 10 is a flowchart diagram of an exemplary process allowing one or more timer processes to execute while a processor is set into a low-power operational mode.

FIG. 10 is a flowchart diagram of a process 1000 that allows one or more timer processes to execute while a processor is set into a low-power operational mode. In one embodiment, the processor is a CPU. In another embodiment, the CPU is the sole CPU of the system or device. In one embodiment, the processor may be a master processor to at least one slave processor. Process 1000 commences at block 1002 with the expiration of a real-time clock alarm, such as alarms 708 and/or 710 from FIG. 7. Upon expiration of a real-time clock alarm, an interrupt may be communicated from real-time clock 700 to processor 602. Accordingly, process 1000 proceeds to block 1004, as processor 602 receives the interrupt from real-time clock 700, and exits (wakes/powers on) from a low-power mode. Those of ordinary skill in the art will recognize that a microcontroller, such as microcontroller 600 may employ one or more methods for interrupting a processor 602 using a real-time clock 700. As such, processor 602 may comprise one or more inputs (input pins, wires, and the like) for receiving an interrupt signal. Upon receipt of an interrupt signal, processor 602 may, in one implementation, be instructed to exit (wake/power on) from a low-power mode into a high-power operational mode. Additionally, and as described in relation to output 722 from real-time clock 700, upon expiration of real-time clock alarm, such as alarms 708 and/or alarm 710, a flag signal may be generated. This flag signal may be received by a processor 602, wherein receipt of a flag signal by processor 602 may cause processor 602 to execute one or more processes associated with the expired real-time clock alarm 708 and/or 710.

Process 1000 may proceed to block 1006, wherein the processor 602 may execute one or more processes to identify one or more expired timers stored in memory, such as memory 604. Upon identification of one or more expired timers (which are distinct from the RTC alarm(s) 708 and 710), process 1000, at block 1008, communicates information to one or more listener processes associated with the expired timers, wherein the communicated information indicates that the timers have reached an expiration time.

Upon expiration of one or more timers in a timer data structure (queue), process 1000 may remove said expired one or more timers from said timer data structure, as indicated at block 1010 of process 1000. Additionally, block 1010 represents one or more processes to reset a real-time clock alarm, such as real-time clock alarm 708 and/or 710 from FIG. 7, with a new expiration time and/or a new expiration period. In one implementation, the real-time clock alarm (708 and/or 710) may be set with an expiration time/expiration period corresponding to an earliest expiration time/period of those remaining timers in a timer collection, such as timer data structures 800 and/or 900. In this way, block 1010 instructs a real-time clock alarm to interrupt processor 602 at a time corresponding to an earliest-expiring timer stored in memory 604. As such, processor 602 can be set into a low-power mode (as indicated by block 1012 of process 1000) while real-time clock module 700 keeps track of the expiration time of a corresponding timer in memory 604. In another example, a real-time clock alarm, such as alarms 708 or alarm 710, may be set to expire at an expiration time corresponding to more than one timer stored in a timer data structure, such as timer data structure 800 or 900 from FIG. 8 or FIG. 9, respectively. In this way, a real-time clock module 700 may be used to allow one or more timer processes, stored in memory 604, to function while processor 602 is set into a low-power mode.

Figure 11:
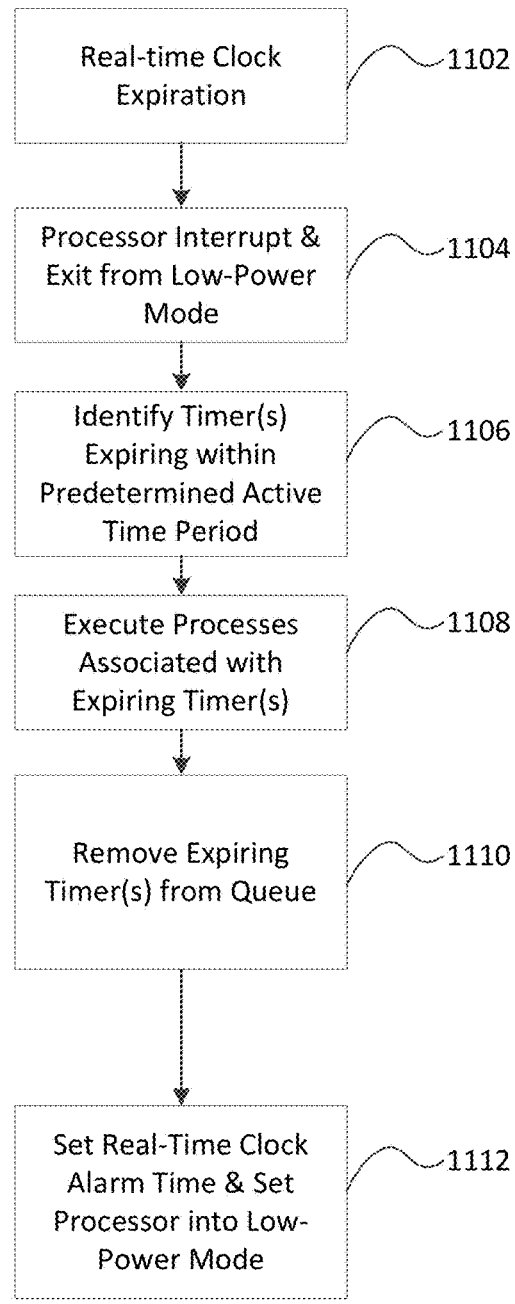
FIG. 11 is a flowchart diagram of an alternative exemplary process for allowing one or more timer processes to execute while a processor operates in a low-power operational mode.

FIG. 11 is a flowchart of an another exemplary process 1100 for allowing one or more timer processes to execute while a processor which may be CPU, and/or the sole CPU is set into a low-power operational mode. In a similar manner to process 1000 from FIG. 10, process 1100 commences at block 1102 with the expiration of a real-time clock alarm, such as real-time clock alarm 708 or 710. In response, process 1100 proceeds to block 1104, and processor 602 receives an interrupt from real-time clock module 700. Upon receipt of an interrupt from real-time clock module 700, processor 602 exits from a low-power operational mode into a high-power operational mode.

At block 1106 of process 1100, processor 602 may identify one or more timers expiring within a predetermined active time period from an expiration time of a real-time clock alarm. In this way, upon interrupting processor 602 from a low-power operational mode in order to execute one or more processes associated with a timer stored in memory 604, process 1100 may not set processor 602 to operate in a low-power operational mode if there exists other timers in a timer collection, such as timer data structure 800 and/or 900, with expiration times within a predetermined active time period. In one implementation, an active time period may have a duration of 10 ms, 30 ms, 100 ms, 250 ms, 500 ms, 1000 ms, 3000 ms, among others. In one example, a real-time clock alarm 708 may interrupt processor 602, setting processor 602 into a high-power operational mode from a low-power operational mode. Accordingly, processor 602 may identify one or more timers, within a timer collection, such as timer data structure 800 or timer data structure 900, with expiration times falling within an active time period from a current time, wherein a current time may be received from real-time clock calendar module 702. In one example, this active time period may measure 100 ms. In response, processor 602 may not be set into a low-power mode until the one or more processes associated with the one or more timers falling within the active time period have been executed. This may be beneficial in certain embodiments in which a process is executed by the processor as a result of an expired timer is estimated or known to have a duration that would benefit from, and/or require the processor to remain in an active state.

In another implementation, processor 602 may not be set into a low-power mode during the time period between two timers if time period between the two timers stored in a timer collection is less than a minimum timer gap duration. Accordingly, in one embodiment, a minimum timer gap duration may measure 10 ms, 30 ms, 100 ms, 250 ms, 500 ms, 1000 ms, 3000 ms, among others.

Block 1108 of process 1100 represents one or more processes executed by processor 602, and associated with one or more of the timers expiring within the predetermined active time period. Block 1110 of process 1100 represents one or more processes executed by processor 602 to remove those timers expiring during the predetermined active time period from the timer data structure (queue).

Block 1112 represents one or more processes to set a real-time clock alarm, such as real-time clock alarm 708 and/or 710 from FIG. 7. In one implementation, block 1112 may set a real-time clock alarm with an expiration time corresponding to a timer having a closest expiration time to a current time, and wherein said timers stored in a timer collection. Furthermore, block 1112 represents one or more processes executed to set processor 602 into a low-power mode. In this way, real-time clock module 700 may maintain one or more timers, stored in a timer data structure, while processor 602 is in a low-power mode.

In any of the above aspects, the various features may be implemented in hardware, or as software modules running on one or more processors. Features of one aspect may be applied to any of the other aspects.

There may also be provided a computer program or a computer program product for carrying out any of the methods described herein, and a computer readable medium having stored thereon a program for carrying out any of the methods described herein. A computer program may be stored on a computer-readable medium, or it could, for example, be in the form of a signal such as a downloadable data signal provided from an Internet website, or it could be in any other form.

The various embodiments described herein may be implemented by specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

For the avoidance of doubt, the present application extends to the subject-matter described in the following numbered Implementations:

Implementation 1. An apparatus, comprising: a processor; a real-time clock alarm module configured to expire a real-time clock alarm after an alarm expiration period; a real-time clock calendar module configured to trigger an expiration of the real-time clock alarm upon agreement between a real-time clock calendar time and an expiration time associated with the real-time clock alarm; and memory storing computer-readable instructions that, when executed by the processor, cause the apparatus to: store one or more timers in a queue, wherein said queue is ordered in order of increasing expiration time for said one or more timers; identify, upon expiration of the real-time clock alarm, one or more expired timers from the one or more timers stored in the queue; execute one or more processes associated with the one or more expired timers; remove the one or more expired timers from the queue; and set the alarm expiration period equal to a first expiration time associated with a first timer remaining in the queue.

Implementation 2. The apparatus of Implementation 1, wherein the computer-readable instructions, when executed by the processor, further cause the apparatus to: set an operational mode of the processor upon setting the alarm expiration period.

Implementation 3. The apparatus of Implementation 2, wherein the operational mode of the processor is a low-power operational mode.

Implementation 4. The apparatus of Implementation 3, wherein the low-power operational mode operates the processor at a low frequency.

Implementation 5. The apparatus Implementation 6, wherein the low-power operational mode reduces power consumption by the processor by at least 90%.

Implementation 6. The apparatus of any of Implementations 1-5, wherein the real-time clock alarm module is configured to trigger an interrupt on the processor upon expiration of the real-time clock alarm.

Implementation 7. The apparatus of Implementation 6, wherein the interrupt wakes the processor from a low-power operational mode.

Implementation 8. The apparatus of any of Implementations 1-7, wherein the apparatus comprises an STM32 microcontroller.

Implementation 9. An apparatus according to any of Implementations 1-8, wherein the apparatus is configured to be worn around an appendage of a user, such as a wrist.

Implementation 10. An apparatus according to any of Implementations 1-9, wherein the apparatus is a unitary apparatus, such as a wristband.

Implementation 11. A method comprising: setting a real-time clock alarm to expire after an alarm expiration period; storing one or more timers in a queue, wherein said queue is ordered in order of increasing expiration time for said one or more timers; identifying, upon expiration of the real-time clock alarm, one or more expired timers from the one or more timers stored in the queue; executing one or more processes associated with the one or more expired timers; removing the one or more expired timers from the queue; and setting the alarm expiration period equal to a first expiration time associated with a first timer remaining in the queue.

Implementation 12. A method according to Implementation 11, wherein steps (a)-(f) are repeated cyclically.

Implementation 13. A non-transitory computer-readable medium comprising executable instructions that when executed cause a computer device to perform the method as described in Implementations 11 or 12.

Implementation 14. A unitary apparatus configured to be worn around the appendage of a user, comprising: a power supply; a sensor configured to capture acceleration data from the appendage of the user; a processor configured to receive captured acceleration data from the sensor; a real-time clock alarm module configured to expire a real-time clock alarm after an alarm expiration period; a non-transitory computer-readable medium comprising computer-executable instructions that when executed by the processor cause the processor to perform at least: store one or more timers in a data structure; identify, upon expiration of the real-time clock alarm, one or more expired timers from the one or more timers stored in the data structure; execute one or more processes associated with the one or more expired timers; remove the one or more expired timers from the data structure; and set the alarm expiration period equal to a first expiration time associated with a first timer in the data structure that has a closest expiration time to a current time.

Implementation 15. The unitary apparatus of Implementation 14, wherein the computer-executable instructions, when executed by the processor, further cause the processor to: set an operational mode of the processor upon setting the alarm expiration period.

Implementation 16. The unitary apparatus of Implementation 15, wherein the operational mode of the processor is a low-power operational mode.

Implementation 17. The unitary apparatus of Implementation 16, wherein the low-power operational mode reduces power consumption by the processor by at least 90%.

Implementation 18. The unitary apparatus of Implementation 16 or 17, wherein the computer-executable instructions, when executed by the processor, cause the processor to further perform: wake the processor from the low-power operational mode upon receipt of acceleration data with a predetermined acceleration characteristic.

Implementation 19. The unitary apparatus of any of Implementations 14-18, wherein the real-time clock alarm module is configured to trigger an interrupt on the processor upon expiration of the real-time clock alarm.

Implementation 20. The unitary apparatus of Implementation 19, wherein the interrupt wakes the processor from a low-power operational mode.

Implementation 21. The unitary apparatus of any of Implementations 14-20, wherein the computer-executable instructions, when executed by the processor, cause the processor to further perform: store a timeout timer in the data structure if no acceleration data is received during a predetermined timeout time period.

Implementation 22. The unitary apparatus of any of Implementations 14-21, wherein the unitary apparatus further comprises a microcontroller.

Implementation 23. The unitary apparatus of any of Implementations 9-22, wherein the unitary apparatus is a wristband.

Implementation 24. A non-transitory computer-readable medium comprising computer-executable instructions that when executed by a processor are configured to perform at least: store one or more timers in a data structure; identify, upon expiration of a real-time clock alarm associated with a real-time clock alarm module, one or more timers, from the data structure, that will expire within a predetermined active time period from a current time indicated by a real-time clock calendar module; execute one or more processes associated with the one or more timers that will expire during the predetermined active time period; set an alarm expiration period of the real-time clock alarm module equal to a future expiration time associated with a timer in the data structure, wherein the future expiration time is a closest expiration time, from the one or more timers, to the current time; and set a low-power operational mode of the processor upon setting the alarm expiration period.

Implementation 25. The non-transitory computer-readable medium of Implementation 24, wherein the real-time clock alarm module is configured to trigger an interrupt on the processor, setting a high-power operational mode of the processor, upon expiration of the real-time clock alarm Implementation 26. The non-transitory computer-readable medium of Implementation 24 or 25, wherein the low-power operational mode reduces a clock frequency of operation of the processor by at least 90%.

Implementation 27. An apparatus comprising the non-transitory computer-readable medium of any of Implementations 24-26.

Implementation 28. An apparatus according to Implementation 27, wherein the apparatus is configured to be worn around an appendage of a user, such as a wrist.

Implementation 29. An apparatus according to Implementation 27 or 28, wherein the apparatus is a unitary apparatus, such as a wristband.

Accordingly, it will be understood that the invention is not to be limited to the embodiments disclosed herein, but is to be understood from the following claims, which are to be interpreted as broadly as allowed under the law.

We claim:

1. An apparatus, comprising:
a sensor configured to output motion data indicative of an amount of acceleration of the apparatus;
a processor;
a real-time clock module implemented as an application-specific integrated circuit hardware element separate from the processor, comprising:
  a real-time clock alarm module, operatively connected to the processor, and configured to trigger a real-time clock alarm at an alarm expiration time causing the real-time clock alarm to communicate an interrupt signal to the processor; and
  a real-time clock calendar module, operatively connected to the real-time clock alarm module, and configured to communicate a real-time clock calendar time to the real-time clock alarm module, wherein the real-time clock alarm is triggered upon agreement of the alarm expiration time and the real-time clock calendar time;
memory storing computer-readable instructions that, when executed by the processor, cause the apparatus to:
  store one or more timers in a queue, wherein each of the one or more timers comprises a value corresponding to a length of time from a current time, said current time indicated by the real-time clock calendar time, wherein said queue is ordered in order of increasing value of said one or more timers, and wherein a time between said one or more timers has any value;
  identify, upon triggering of the real-time clock alarm, one or more expired timers from said one or more timers stored in the queue;
  execute one or more processes associated with the one or more expired timers;
  remove the one or more expired timers from the queue;
  set, upon triggering of the real-time clock alarm, a new alarm expiration time equal to a time value that is an amount of time ahead of the real-time clock calendar time equal to a value of a first timer remaining in the queue; and
  store a timeout timer in the queue if the motion data received from the sensor during a predetermined timeout time period indicates that the apparatus is not accelerating.

2. The apparatus of claim 1, wherein the computer-readable instructions, when executed by the processor, further cause the apparatus to:

set an operational mode of the processor upon setting the alarm expiration time.

3. The apparatus of claim 2, wherein the operational mode of the processor is a low-power operational mode.

4. The apparatus of claim 3, wherein the low-power operational mode operates the processor at a low frequency.

5. The apparatus of claim 1, wherein the interrupt signal wakes the processor from a low-power operational mode.

6. The apparatus of claim 5, wherein the low-power operational mode reduces power consumption by the processor by at least 90%.

7. A unitary apparatus configured to be worn by a user, comprising:
  a structure configured to be worn around an appendage of a user, comprising:
    a power supply;
    a sensor configured to capture acceleration data from the appendage of the user;
    a processor, operatively connected to the sensor, and configured to receive captured acceleration data;
    a real-time clock alarm module, implemented as an application-specific integrated circuit hardware element separate from and operatively connected to the processor, and configured to trigger a real-time clock alarm causing the real-time clock alarm to communicate an interrupt signal to the processor upon agreement of an alarm expiration time and a current time;
    a non-transitory computer-readable medium comprising computer-executable instructions that when executed by the processor cause the processor to perform at least the following:
      store one or more timers in a data structure;
      identify, upon triggering of the real-time clock alarm, one or more expired timers from the one or more timers stored in the data structure;
      execute one or more processes associated with the one or more expired timers;
      remove the one or more expired timers from the data structure;
      set, upon triggering of the real-time clock alarm, a new alarm expiration time equal to a time value that is an amount of time ahead of the current time equal to a lowest value of the one or more timers in the data structure; and
      store a timeout timer in the data structure if the acceleration data received during a predetermined timeout time period indicates that the unitary apparatus is not accelerating.

8. The unitary apparatus of claim 7, wherein the computer-executable instructions, when executed by the processor, further cause the processor to:
  set an operational mode of the processor upon setting the alarm expiration time.

9. The unitary apparatus of claim 8, wherein the operational mode of the processor is a low-power operational mode.

10. The unitary apparatus of claim 9, wherein the low-power operational mode reduces power consumption by the processor by at least 90%.

11. The unitary apparatus of claim 9, wherein the computer-executable instructions, when executed by the processor, cause the processor to:
  waken the processor from the low-power operational mode upon receipt of acceleration data with a predetermined acceleration characteristic.

12. The unitary apparatus of claim 7, wherein the interrupt signal wakes the processor from a low-power operational mode.

13. A non-transitory computer-readable medium comprising computer-executable instructions that when executed by a processor are configured to perform at least the following:
  store one or more timers in a data structure;
  identify, upon triggering of a real-time clock alarm associated with a real-time clock alarm module implemented as an application-specific integrated circuit hardware element separate from the processor, one or more timers, from the data structure, that will expire within a predetermined active time period from a current time indicated by a real-time clock calendar module;
  execute one or more processes associated with the one or more timers that will expire during the predetermined active time period;
  set a new alarm expiration time of the real-time clock alarm module equal to a future expiration time associated with a timer in the data structure, wherein the future expiration time is a closest expiration time, from the one or more timers, to the current time;
  set a low-power operational mode of the processor upon setting the alarm expiration time; and
  store a timeout timer in the data structure if no motion data is received by the real-time clock alarm module.

14. The non-transitory computer-readable medium of claim 13, wherein the real-time clock alarm module is configured to trigger an interrupt on the processor by outputting an interrupt signal that initiates a high-power operational mode of the processor, upon agreement of the alarm expiration time and the current time.

15. The non-transitory computer-readable medium of claim 13, wherein the low-power operational mode reduces a clock frequency of operation of the processor by at least 90%.

* * * * *